United States Patent
Chen et al.

(10) Patent No.: US 6,895,103 B2
(45) Date of Patent: May 17, 2005

(54) METHOD FOR AUTOMATICALLY LOCATING EYES IN AN IMAGE

(75) Inventors: Shoupu Chen, Rochester, NY (US); Jiebo Luo, Pittsford, NY (US)

(73) Assignee: Eastman Kodak Company, Rochester, NY (US)

(*) Notice: Subject to any disclaimer, the term of this patent is extended or adjusted under 35 U.S.C. 154(b) by 677 days.

(21) Appl. No.: 09/884,373

(22) Filed: Jun. 19, 2001

(65) Prior Publication Data

US 2003/0016846 A1 Jan. 23, 2003

(51) Int. Cl.⁷ ................................................. G06K 9/00

(52) U.S. Cl. ..................... 382/117; 382/118; 382/165; 382/209; 382/224; 382/225; 382/226; 340/5.53; 340/5.83

(58) Field of Search ................................ 382/117, 118, 382/165, 209, 224, 228, 225; 340/5.1, 5.2, 5.53, 5.83; 348/169; 356/71

(56) References Cited

U.S. PATENT DOCUMENTS

| | | | |
|---|---|---|---|
| 5,892,837 A | 4/1999 | Luo et al. | |
| 6,072,892 A | 6/2000 | Kim | |
| 6,072,893 A | 6/2000 | Luo et al. | |
| 6,292,575 B1 * | 9/2001 | Bortolussi et al. | 382/118 |

FOREIGN PATENT DOCUMENTS

| | | | |
|---|---|---|---|
| EP | 0 899 680 A2 | 3/1999 | |
| EP | 0 899 686 A2 | 3/1999 | |
| EP | 0 961 225 A2 | 12/1999 | |

OTHER PUBLICATIONS

Sung, Thesis for Ph.D.: Learning and Example Selection for Object and Pattern Detection, M.I.T. Artificial Intelligence Lab, AITR No. 1572, Jan. 1996, pp. 1–195.

U.S. Appl. No. 09/692,930, filed Oct. 20, 2000 by Chen et al.

WO 97/21188 A (Sarnoff David Res. Center) Jun. 12, 1997 p. 43, line 29, –p. 44, line 4.

Chang Thomas C. et al.: "Facial Feature Extraction from Color Images" Pattern Recognition, 1994, vol. 2—Conference B: Computer Vision & Image Processing., Proceedings of the 12$^{th}$ IAPR International. Conference on Jerusalem, Israel Oct. 9–13, 1994, Los Alamitos CA., USA, IEEE Comput. Soc., Oct. 9, 1994, pp. 39–43, XP010216250, ISBN: 0–8186–6270–0, paragraph 03.2–paragraph 03.6.

Chow Gloria et al.: "Towards a System for Automatic Facial Feature Detection" Pattern Recognition, Pergamon Press Inc. Elmsford, N.Y. US, vol. 26, No. 12, Dec. 1, 1993, pp. 1739–1755, XP000420368, ISSN: 0031–3203 Introduction.

* cited by examiner

Primary Examiner—Bhavesh M. Mehta
Assistant Examiner—John Strege
(74) Attorney, Agent, or Firm—Thomas H. Close

(57) ABSTRACT

A digital image processing method for locating human eyes in a digital image, includes the steps of detecting a skin colored region in the image; detecting human iris color pixels in the skin colored region; forming initial estimates of eye positions using the locations of the detected iris color pixels in the skin colored region; estimating the size of each eye based on the distance between the estimated initial eye positions; forming a first search window for one eye, the center of the window being the estimated initial position for the one eye and the size of the window being proportional to the estimated size of the one eye; and employing a template to locate an eye in the first search window.

15 Claims, 14 Drawing Sheets

FIG. 7a1

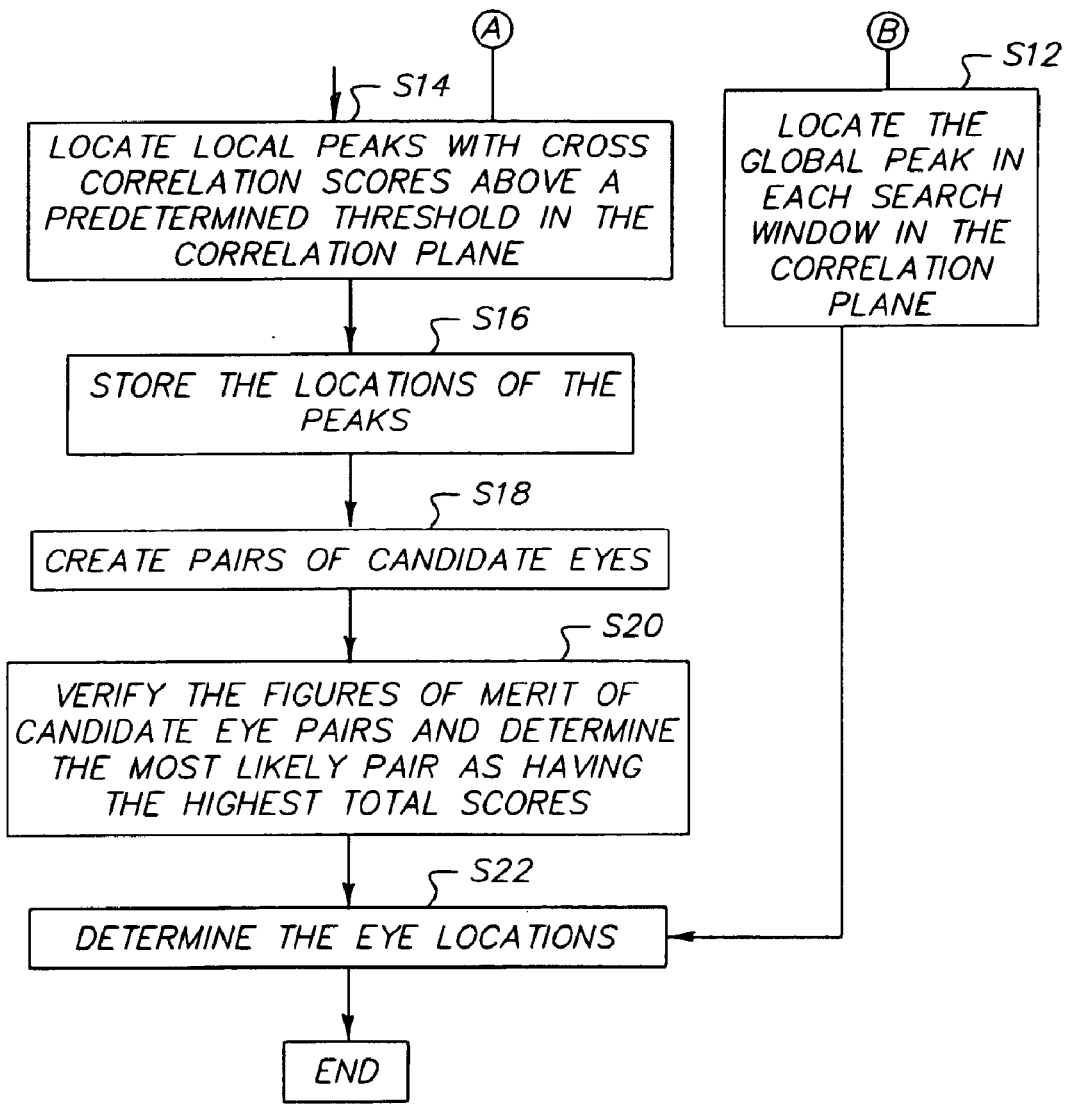
FIG. 7a2

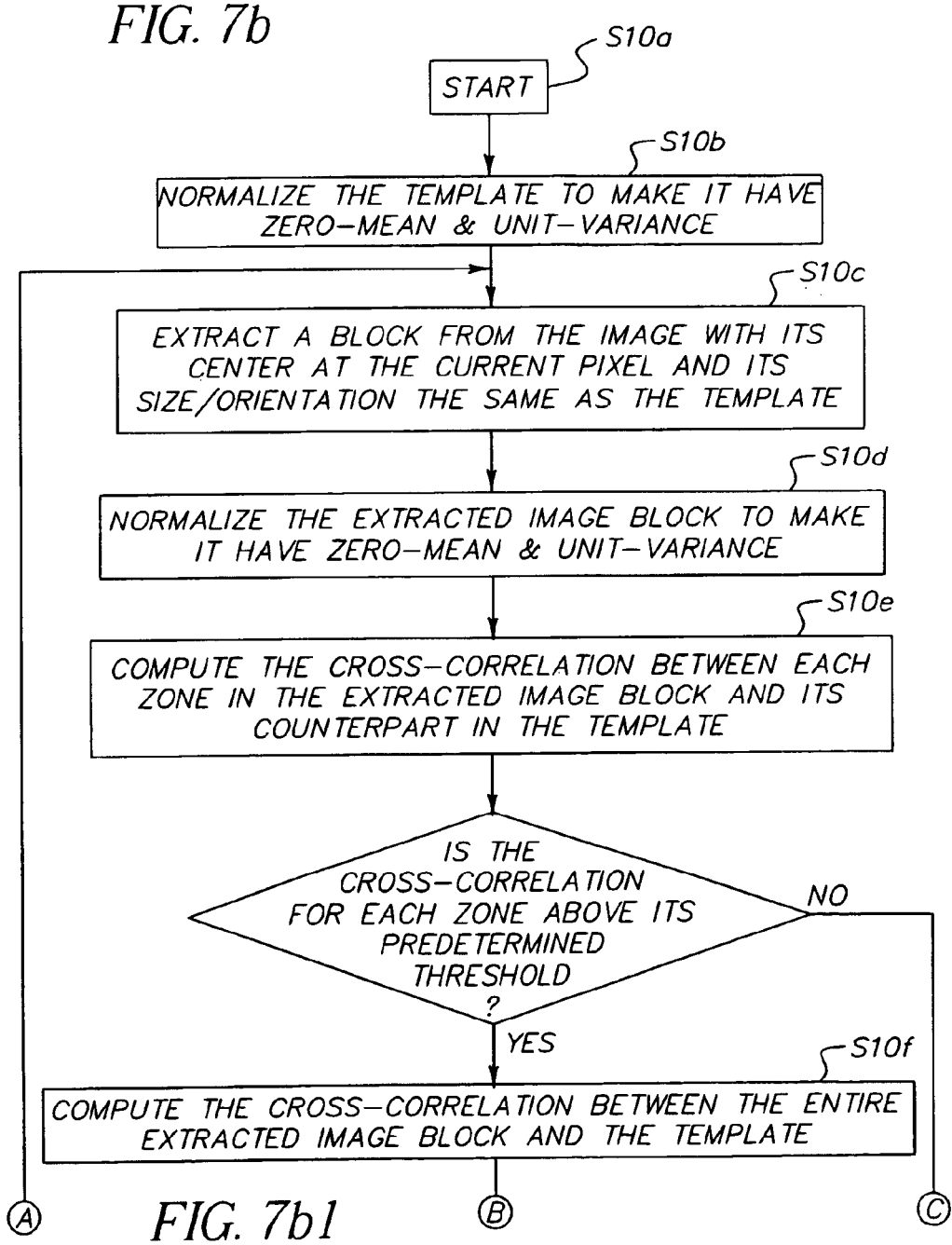
FIG. 7b1

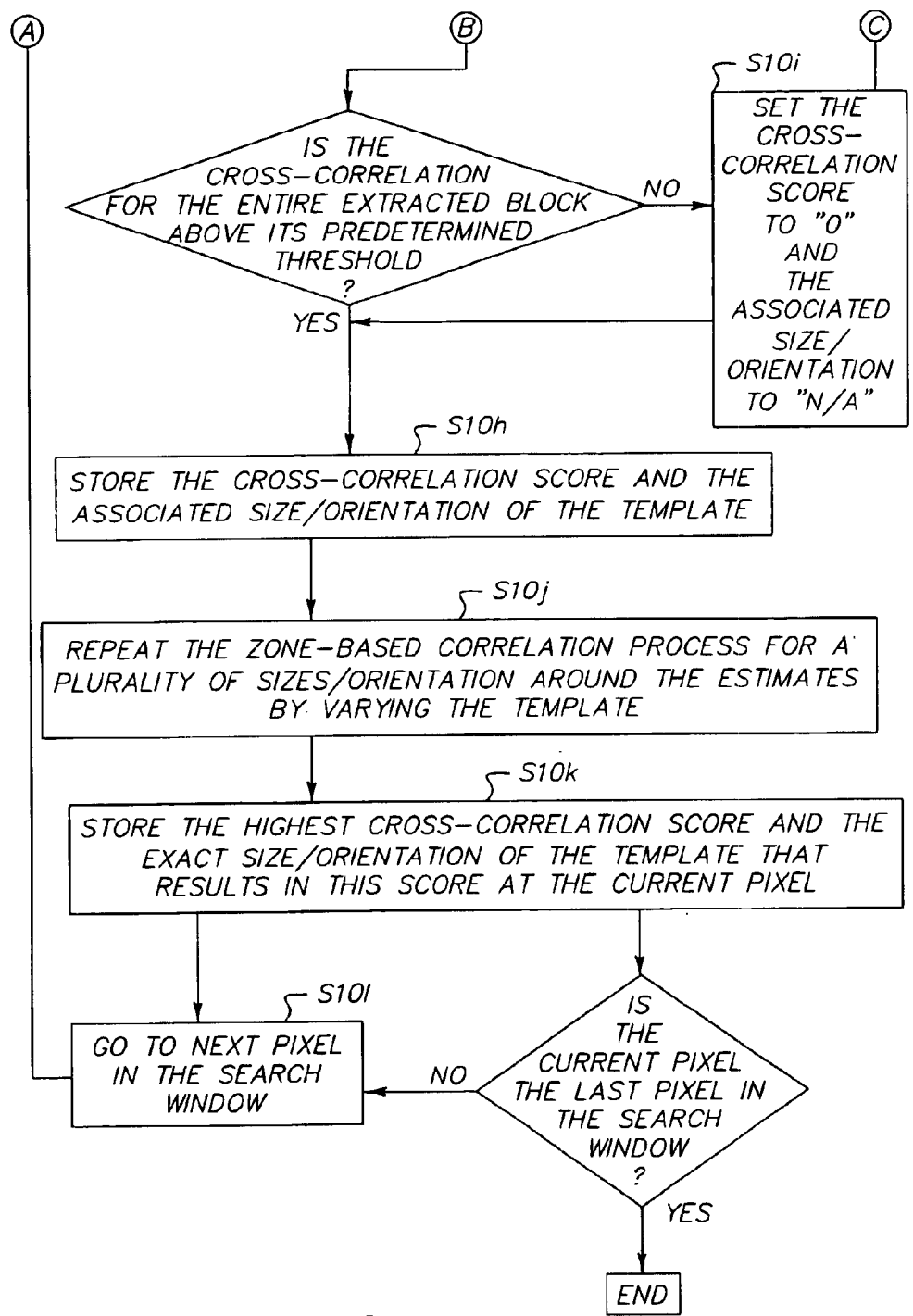
FIG. 7b2

θ1: ORIENTATION OF THE FIRST OBJECT (IN THIS CASE NEGATIVE)
θ2: ORIENTATION OF THE SECOND OBJECT (IN THIS CASE POSITIVE)
θ: ORIENTATION OF THE LINE CONNECTING THE CENTERS OF THE FIRST AND SECOND OBJECTS
d: DISTANCE BETWEEN THE CENTERS OF THE FIRST AND SECOND OBJECTS
s1: SIZE OF THE FIRST OBJECT
s2: SIZE OF THE SECOND OBJECT

A PREFERRED SCORING FUNCTION f(x)

METHOD FOR AUTOMATICALLY LOCATING EYES IN AN IMAGE

FIELD OF THE INVENTION

The present invention relates to digital image processing methods for automatically locating objects and more particularly to methods of locating human eyes.

BACKGROUND OF THE INVENTION

In digital image processing it is often useful to detect the areas in an image that are human eyes. This information is used for example, to locate other features in the image relative to the eyes, or to find the orientation of a human face in the image. U.S. Pat. No. 6,072,892 issued Jun. 6, 2000 to Kim discloses a method for detecting the position of eyes in a facial image using a simple thresholding method on an intensity histogram of the image to find three peaks in the histogram representing skin, white of the eye, and pupil.

One of the problems with this approach is that it needs to scan the entire image, pixel by pixel, and position a search window at each pixel that is not only unnecessary in consuming enormous computing power, but also it may produce a high rate of false positives because of similar histogram patterns that occur in places other than eye regions.

A neural networks method of locating human eyes is disclosed in *Learning and Example Selection for Object and Pattern Detection*, A.I.T.R. No. 1572, MIT, by Kah-Kay Sung, January, 1996. This method discloses training a neural network to recognize eyes with acceptable distortion from a pre-selected eye template. The operator repeatedly distorts the original eye template and all variations produced from distorting eyes are labeled as either acceptable or unacceptable. The distorted samples, i.e., the training images, and the associated labeling information are fed to the neural network. This training process is repeated until the neural network has achieved satisfactory recognition performance for the training images. The trained neural network effectively has stored a plurality of possible variations of the eye. Locating an eye is done by feeding a region in the image to the neural network for determining if a desired output, i.e., a match, occurs; all matches are identified as eyes.

Although the presently known and utilized methods of identifying eyes are satisfactory, they are not without drawbacks. The touch screen method requires constant human interaction of repeatedly touching the touch screen for zooming in on the eye and, as a result, is somewhat labor intensive. Still further, the neural network method requires extensive training, and also exhaustive search to be performed for all the possible sizes and orientations of the eye. A method disclosed by Luo et al. (see U.S. Pat. No. 5,892,837, issued Apr. 6, 1999) improves the method of locating eyes in an image so as to overcome the above-described drawbacks. In Luo's method, the search of the eye position starts with two approximate locations provided by the user. In some applications, it is more desirable to have completely automatic eye positioning mechanism.

There is a need therefore for an improved method of utilizing other information embedded in a digital facial image to locate human eyes in a completely automatic, yet computationally efficient manner.

SUMMARY OF THE INVENTION

The need is met according to the present invention by providing a digital image processing method for locating human eyes in a digital image, including the steps of. detecting a skin colored region in the image; detecting human iris color pixels in the skin colored region, forming initial estimates of eye positions using the locations of the detected iris color pixels in the skin colored region; estimating the size of each eye based on the distance between the estimated initial eye positions; forming a first search window for one eye, the center of the window being the estimated initial position for the one eye and the size of the window being proportional to the estimated size of the one eye; and employing a template to locate an eye in the first search window.

ADVANTAGES

The present invention is effective for automatically obtaining eye positions in a frontal face image and has the advantage of reducing the region of the image that must be searched, thereby greatly reducing the computation required to locate an eye, and reducing the incidence of false positive eye detection.

BRIEF DESCRIPTION OF THE DRAWINGS

FIG. 7b is a detailed diagram illustrating the zone-based cross-correlation process;

DETAILED DESCRIPTION OF THE INVENTION

Figure 1:
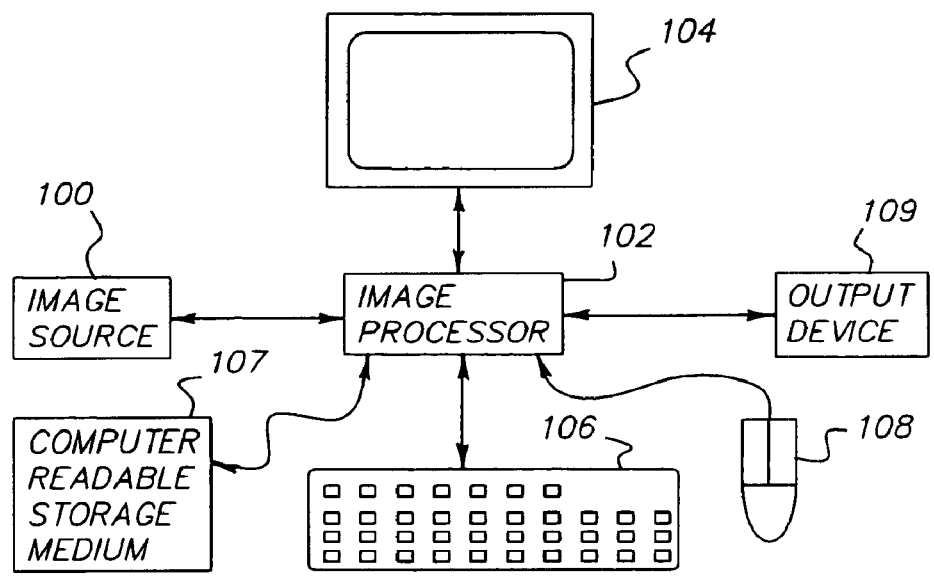
FIG. 1 is a schematic diagram of an image processing system useful in practicing the present invention.

FIG. 1, shows an image processing system useful in practicing the present invention including a color digital image source 100, such as a film scanner, digital camera, or digital image storage device such as a compact disk drive with a Picture CD. The digital image from the digital image source 100 is provided to an image processor 102, such as a programmable personal computer, or digital image processing work station such as a Sun Sparc workstation. The image processor 102 may be connected to a CRT display 104, an operator interface such as a keyboard 106 and a mouse 108. Image processor 102 is also connected to computer readable storage medium 107. The image processor 102 transmits processed digital images to an output device 109. Output device 109 can comprise a hard copy printer, a long-term image storage device, a connection to another processor, or an image telecommunication device connected, for example, to the Internet.

In the following description, a preferred embodiment of the present invention will be described as a method. However, in another preferred embodiment, the present invention comprises a computer program product for detecting human eyes and irises in a digital image in accordance with the method described. In describing the present invention, it should be apparent that the computer program of the present invention can be utilized by any well-known computer system, such as the personal computer of the type shown in FIG. 1. However, many other types of computer systems can be used to execute the computer program of the present invention. Consequently, the computer system will not be discussed in further detail herein It will be understood that the computer program product of the present invention may make use of image manipulation algorithms and processes that are well known. Accordingly, the present description will be directed in particular to those algorithms and processes forming part of, or cooperating more directly with, the method of the present invention. Thus, it will be understood that the computer program product embodiment of the present invention may embody algorithms and processes not specifically shown or described herein that are useful for implementation. Such algorithms and processes are conventional and within the ordinary skill in such arts Other aspects of such algorithms and systems, and hardware and/or software for producing and otherwise processing the images involved or co-operating with the computer program product of the present invention, are not specifically shown or described herein and may be selected from such algorithms, systems, hardware, components, and elements known in the art.

The computer program for performing the method of the present invention may be stored in a computer readable storage medium. This medium may comprise, for example magnetic storage media such as a magnetic disk (such as a hard drive or a floppy disk) or magnetic tape, optical storage media such as an optical disc, optical tape, or machine readable bar code; solid state electronic storage devices such as random access memory (RAM), or read only memory (ROM), or any other physical device or medium employed to store a computer program. The computer program for performing the method of the present invention may also be stored on computer readable storage medium that is connected to the image processor by way of the Internet or other communication medium. Those skilled in the art will readily recognize that the equivalent of such a computer program product may also be constructed in hardware.

Figure 2:
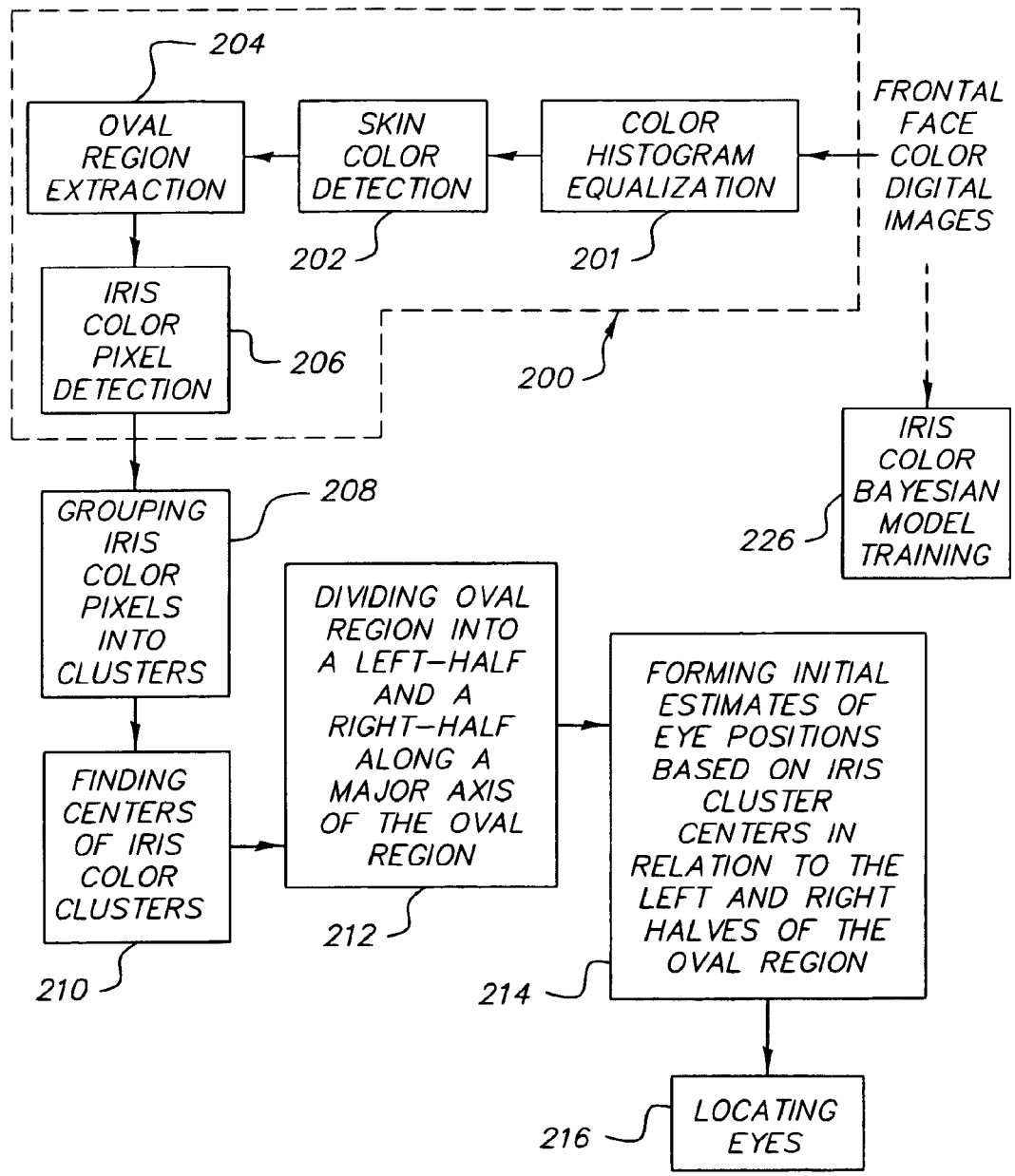
FIG. 2 is a flowchart illustrating the eye detection method of the present invention.

Turning now to FIG. 2, the method of the present invention will be described in greater detail. FIG. 2 is a flow chart illustrating one embodiment of the iris color pixel detection method of the present invention. In the embodiment shown in FIG. 2, iris color pixel detection 200 is accomplished by first detecting skin colored regions in the image and then identifying iris pixels from the skin colored regions.

The first step in skin color detection is color histogram equalization shown in FIG. 2 as block 201. Color Histogram Equalization block 201 receives images to be processed and ensures that the images are in a form that will permit skin color detection. This step is made necessary because human skin may take on any number of colors in an image because of lighting conditions, flash settings or other circumstances. This makes it difficult to automatically detect skin in such images. In Color Histogram Equalization block 201, a statistical analysis of each image is performed. If the mean intensity of any one of the color channels in the image is less than a predetermined value, then the color histogram equalization is performed on the image. In such cases, if the statistical analysis suggests that the image may contain regions of skin that have had their appearance modified by lighting conditions, flash settings or other circumstances, then such images are modified so that skin colored regions can be detected. After the color histogram equalization block, the image is searched for skin color regions in skin color detection block 202. While it is possible to detect skin in a digital image in a number of ways, a preferred method for detecting skin in a digital image is the method that is described in commonly assigned and co-pending application Ser. No. 09/692,930. In this method, skin color pixels are separated from other pixels by defining a working color space that contains a range of possible skin colors collected from a large, well-balanced population of images. A pixel is then identified as skin color pixel if the pixel has a color that is within the working color space.

Skin color detection block 202 identifies a region of skin color pixels in the image. This region can be defined in a number of ways. In one embodiment, the skin color region is defined by generating a set of pixel locations identifying the pixels in the image having skin colors. In another embodiment, a modified image is generated that contains only skin color pixels. In yet another embodiment, skin color detection block 202 defines boundaries that confine the skin color region in the image It will be recognized that more than one skin color region can be identified in the image.

Oval region extraction block 204 examines the skin color regions detected by the skin color detection block 202 to locate skin color regions that may be indicative of a face. Because the human face has a roughly oval shape, the skin color regions are examined to locate an oval shaped skin color region. When an oval shaped skin color region is found, the oval region extraction block 204 measures the geometric properties of the oval shaped skin color region. The oval region extraction block 204 uses these measurements to define parameters that describe the size of the face and the location of the face within the image.

Figure 3:
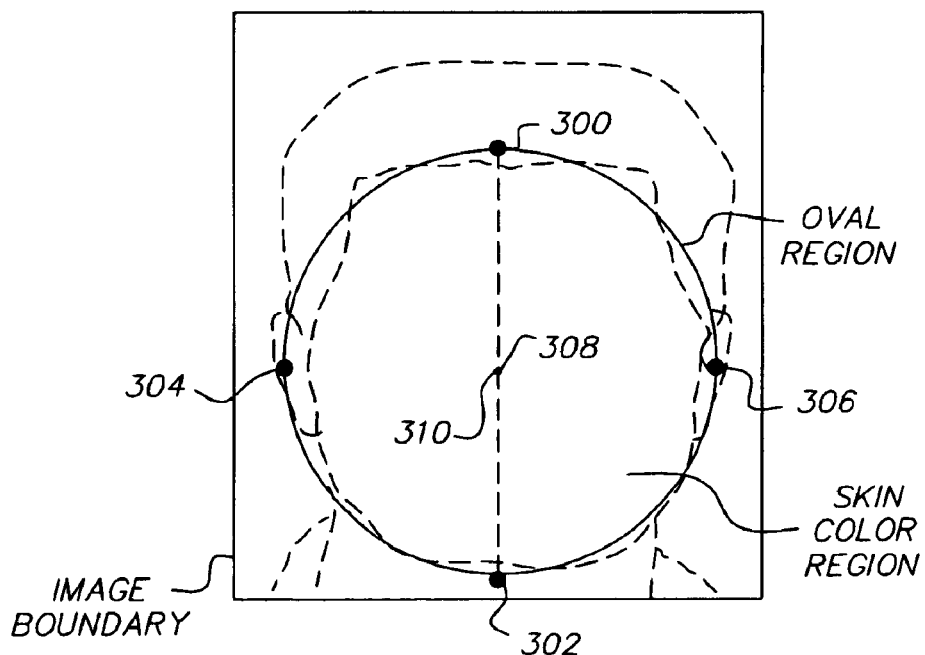
FIG. 3 is an illustration showing the oval region of a human face.

FIG. 3 is an illustration of the relationship between the geometric parameters used to define an oval shaped skin color region in the image. The geometric parameters are determined by computing the moments of the skin color region and using the moments to estimate the ellipse parameters. As is shown in FIG. 3, these parameters include Oval_top 300, Oval_bottom 302, Oval_left 304, Oval_right 306, Oval_center_row 308, and Oval_center_column 310. These parameters are can be used in subsequent processing of the image. It will be recognized that the method of the present invention can be practiced using skin color detection regions that have shapes that are other than oval and that other geometric parameters can be defined in association with such shapes.

After the oval region extraction has been performed, iris color pixel detection block 206 examines the pixels in the oval shaped skin color region to detect iris color pixels. In the method of the present invention, iris color pixel detection block 206 determines whether a pixel is an iris by measuring the red intensity of the pixel. Red intensity levels are measured because it has been observed that that a human iris has a low red intensity level as compared to human skin which has a relatively high red intensity level. However, the preferred method of the present invention does not use a red level thresholding method to determine whether a pixel is to be classified as an iris or as a non-iris.

Figure 4:
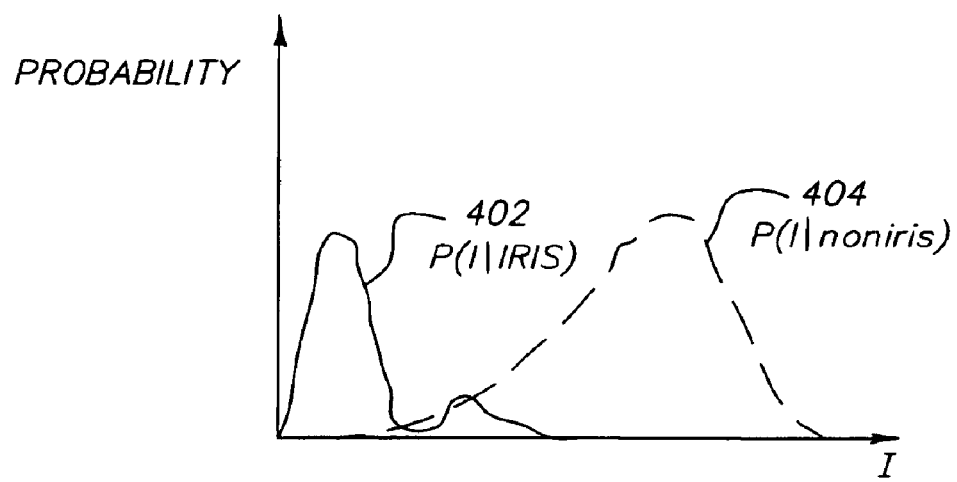
FIG. 4 is a flowchart presenting iris and noniris pixel intensity distributions.

Instead, in the preferred method of the present invention a pixel is classified as an iris or a non-iris pixel on the basis of a probability analysis. This probability analysis applies an iris statistical model and a non-iris statistical model. The iris statistical model defines the probability that a given pixel is an iris pixel based upon the red intensity level of the pixel. Similarly, the non-iris statistical model defines the probability that a given pixel is not an iris pixel based upon the red intensity level of the pixel The relationship between these models is non-linear as is shown by way of example in FIG. 4 which is an illustration of the conditional probability 402 that a given pixel is an iris pixel stated as a function of a specific red intensity and the conditional probability 404 that a given pixel is a non-iris pixel as a function of a specific red intensity I.

The probability analysis can take many forms. For example, the probabilities can be combined in various ways with a pixel being classified as an iris or not on the basis of the relationship between these probabilities. However, in a preferred embodiment, a mathematical construct known as a Bayes model is used to combine the probabilities to produce the conditional probability that a pixel having a given red intensity belongs to an iris.

In this embodiment, the Bayes model is applied as follows:

$$P(\text{iris} \mid I) = \frac{P(I \mid \text{iris})P(\text{iris})}{P(I \mid \text{iris})P(\text{iris}) + P(I \mid \text{noniris})P(\text{noniris})},$$

where P(iris|I) is the conditional probability that a given pixel intensity belongs to an iris; P(I|iris) is the conditional probability that a given iris pixel has a specific intensity I; P(iris) is the probability of the occurrence of an iris in the face oval region; P(I|noniris) is the conditional probability that a given non-iris pixel has a specific intensity I, and P(noniris) is the probability of the occurrence of a non-iris pixel in the face oval region. The Bayes model further applies the probability of the occurrence of an iris in a face oval region and the probability of the occurrence of a non-iris pixel in the face oval region. Using a probability analysis based on the Bayes model, a pixel is classified as an iris if the conditional probability that a pixel having a given red intensity belongs to an iris is greater than, for example, 0.05.

In the embodiment described above, only those pixels in the oval shaped skin color region defined by Oval_top 300, Oval_bottom 302, Oval_left 304, and Oval_right 306 are examined. Confining the pixels to be examined to those in the oval shaped skin color region reduces the number of pixels to be examined and decreases the likelihood that pixels that are not irises will be classified as such. It will be recognized that shapes other than an oval can be used to model the human face and that parameters that are appropriate to such shapes are used in subsequent processing of the image.

Figure 5:
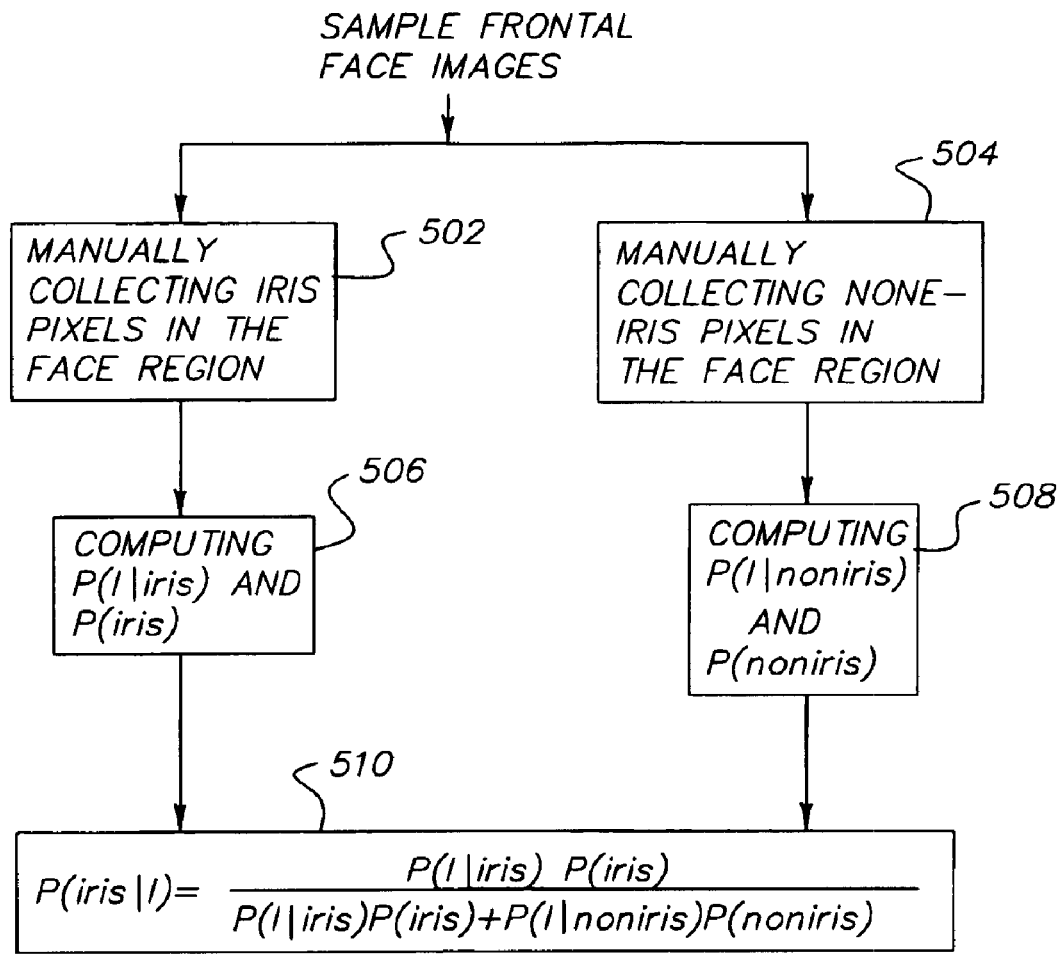
FIG. 5 is a flowchart illustrating the process of Bayesian iris modeling.

Further, it will be understood that iris pixels can be detected from a skin color region in an image without first detecting an oval or other shaped area. In such a case, each pixel of the skin color region is examined to detect iris color pixels and parameters defining the skin colored region are used later in the eye detection process FIG. 5 shows a flow chart illustrating the processes used in the iris color/Bayes model training block 226 of FIG. 2 for developing the statistical models used to classify the pixels. This step will be performed before the method for detecting irises is used to detect iris pixels. As is shown, a large sample of frontal face images are collected and examined. All iris pixels and non-iris pixels in the face region of each image are then manually identified 502, 504. Next, the conditional probability that a given iris pixel has a specific red intensity I, P(I|iris) is computed and the probability of the occurrence of an iris in the face oval region, P(iris) 506 is computed; then the conditional probability that a given noniris pixel has a specific red intensity I, P(I|noniris) is computed and finally the probability of the occurrence of a non-ins pixel in the face oval region, P(noniris) 508 is computed. The computed statistical models of iris and non-iris are used in the Bayes formula to produce the conditional probability that a given pixel intensity belongs to an iris, P(iris|I) 510. In application, the Bayes model can be used to generate a look-up table to be used in iris color pixel detection block 206.

The iris color pixel detection block 206 identifies the location of the iris color pixels in the image. In some cases, it will be desirable to ensure that the iris color pixels that are detected are associated with an eye. This is done by performing the step of eye detection. Initial estimate of eye position block 214 is used to estimate the eye positions. It will be appreciated that there are many ways to determine whether an iris pixel is associated with an eye in the image. In one preferred embodiment of the present invention, the iris color pixel locations are used to facilitate the process of determining whether an iris pixel is associated with an eye in the image.

Detected iris color pixels are grouped into clusters 208. A cluster is a non-empty set of iris color pixels with the property that any pixel within the cluster is also within a predefined distance to another pixel in the cluster. One example of a predefined distance is one thirtieth of the digital image height. The iris color pixel grouping process 208 groups iris color pixels into clusters based upon this definition of a cluster. However, it will be understood that pixels may be clustered on the basis of other criteria.

Under certain circumstances a cluster of pixels may not be valid. A cluster may be invalid because, it contains too many iris color pixels or because the geometric relationship of the pixels in the cluster suggests that the cluster is not indicative of an iris. For example, if the height to width ratio is greater than 2.0, then this cluster is invalid. For another example, if the number of pixels in a cluster is greater than 10% of the total pixel numbers in the image, then this cluster is invalid. Invalid iris pixel clusters are removed from further consideration by the method of the present invention. Further iris color pixel cluster validating processes are performed in the following steps.

After the clustering operation, a center for each of the clusters is calculated in finding cluster center block 210. The center of a cluster is determined as the "center of mass" of the cluster. The center position of the clusters is calculated with respect to the origin of the image coordinate system. The origin of the image coordinate system for a digital image may be defined as the upper left corner of the image boundary. Iris color pixel cluster validating process continues in block 210. If the vertical coordinate of the cluster center is higher than Oval_center_row 308 plus a margin M, then this cluster is invalid and removed from further consideration. An example value for margin M is 5% of (Oval_bottom 302–Oval_top 300).

Figure 6:
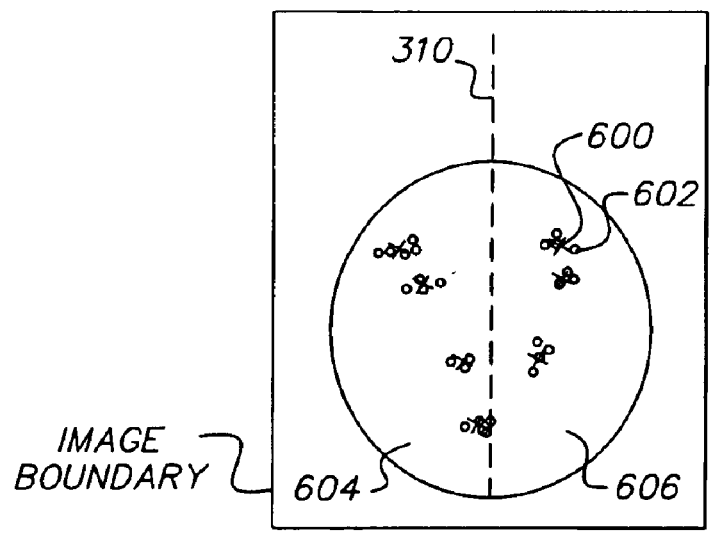
FIG. 6 is an illustration showing the iris color pixel clusters.

Oval division block 212 uses the oval_center_column 310 parameter to separate the oval shaped skin color region into a left-half region and a right-half region. As is shown in FIG. 6 iris pixel clusters 602 and the center positions 600 of the iris pixel clusters 602 are positioned in either the left-half or right-half regions 604 and 606 separated by the Oval_center_column 310.

In block 214, the process of forming initial estimates of eye positions pairs each cluster in the left-half region with each cluster in the right-half region based on the cluster center locations. If the distance between the two clusters' center in a pair is less than K times the distance between Oval_right 306 and Oval_left 304 and if the vertical distance between two clusters' center in a pair is less than N times the distance between Oval_top 300 and Oval_bottom 302, then the center locations of this cluster pair are treated as the initial estimates of two eyes. An example value of K is 0.4 and an example value of N is 0.1. The process of forming initial estimates of eye positions pairs may find more than one pairs of estimates of eye positions which are used in block 216 to locate a final eye positions. The process of locating eyes is detailed next.

Figure 7A:
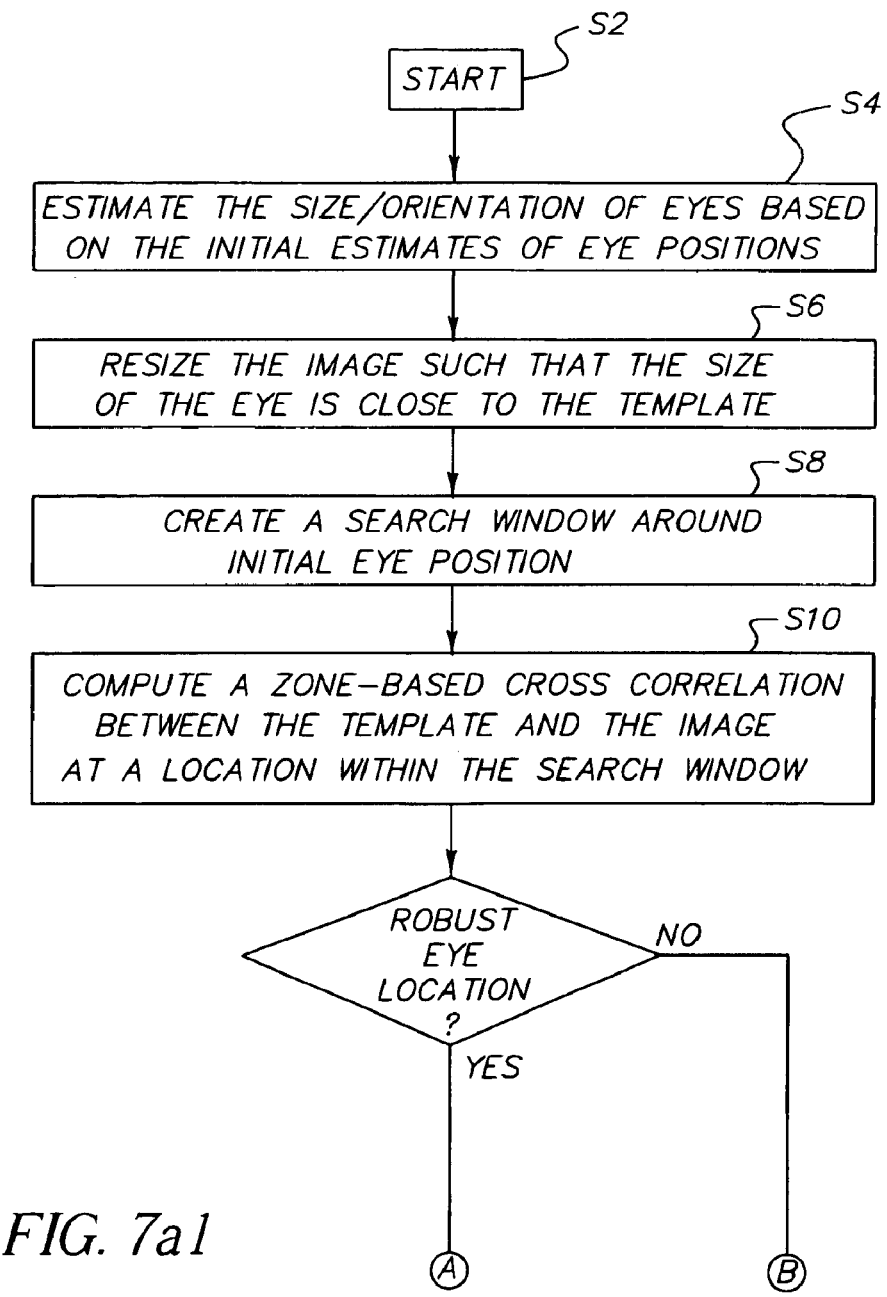
FIG. 7a is a flow chart illustrating the matching procedure used by the present invention.

Now, referring to FIG. 7a, there is illustrated a flowchart of the process of locating eyes The process is initiated S2 by receiving the location data from block 214. The process then determines an estimated size of the eyes S4 by the following equation, which is graphically illustrated in FIG. 9 where d is the distance in pixels between a pair of initial estimates of eye positions, and s is the estimate size, or length, of the eye in pixels. In the present invention, $s=d/1.618$.

Figure 9:
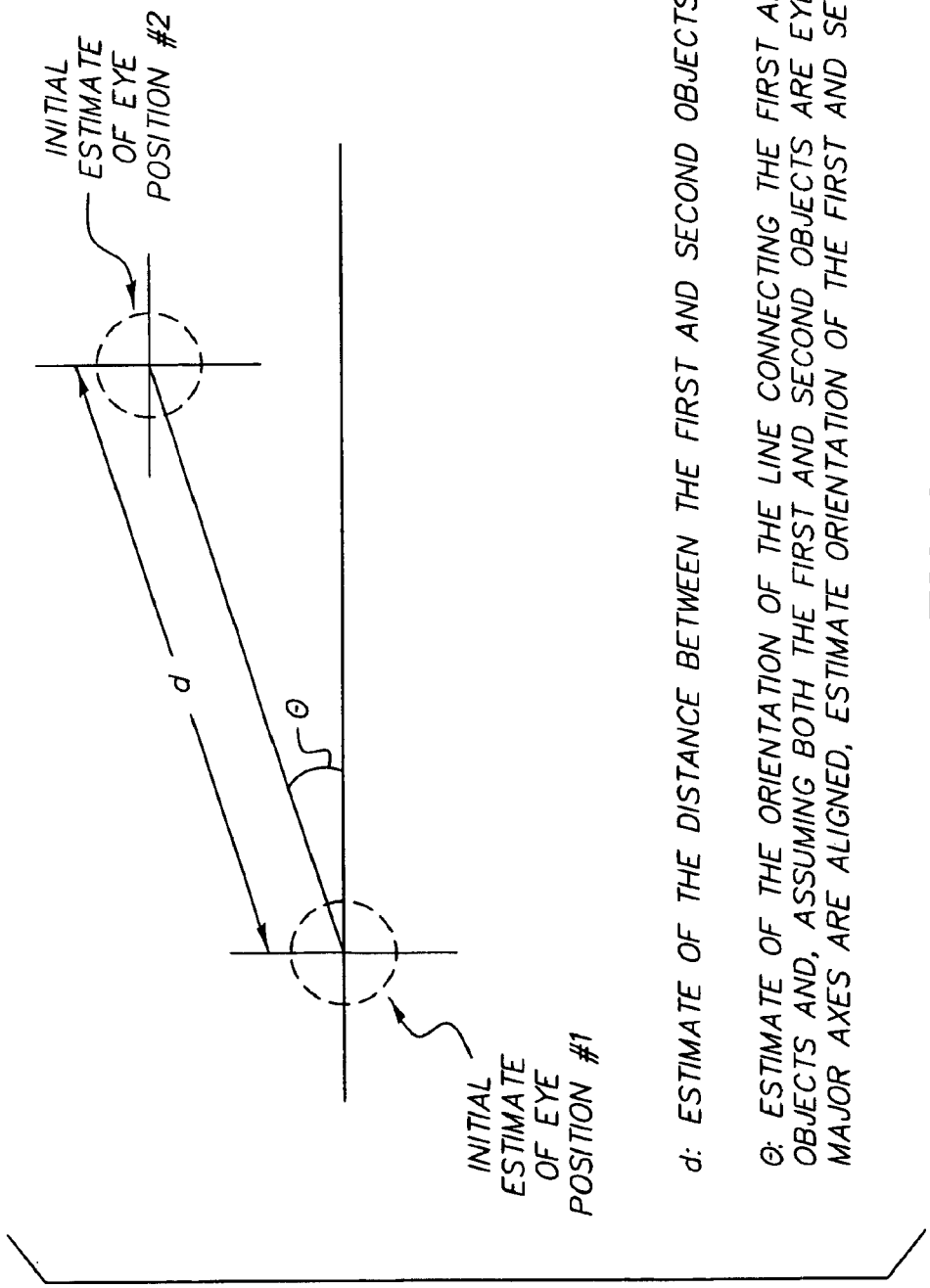
FIG. 9 is an illustration of obtaining estimates of size and orientation of the objects.

An estimated angular orientation of the eye is also generated from the pair of initial estimates of eye positions S4, as illustrated in FIG. 9. The assumption is that the two eyes are aligned and therefore the orientation of each eye is approximately the same as the orientation of the line connecting the two eyes. This estimated angle, denoted by $\theta$, is between a line connecting the pair of initial estimates of eye positions and a horizontal line through one of initial estimates of eye positions, preferably the eye position on the left.

Figure 8:
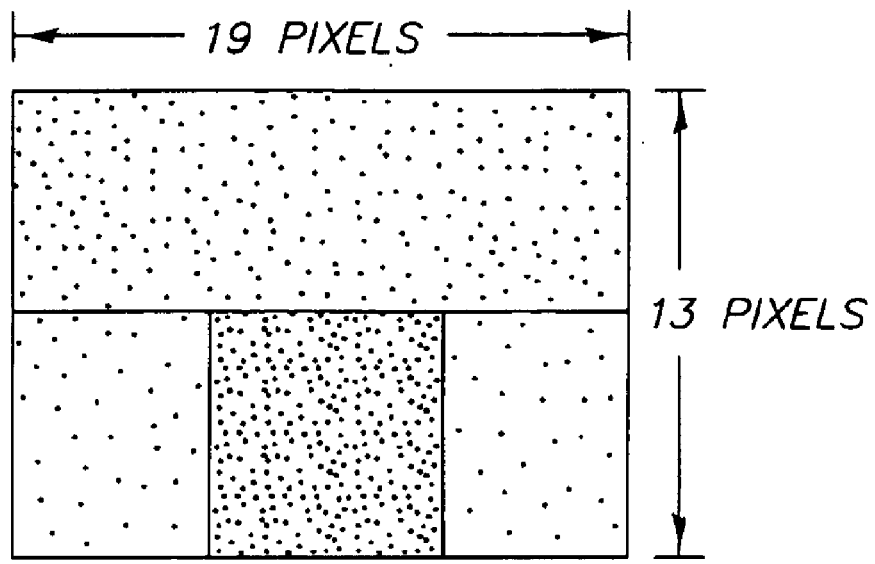
FIG. 8 is a view of the zone partition of the template of the present invention.

It is instructive to note that, from this estimated eye size, the resolution of the input image is changed so that the eyes in the image have approximately the same size as the eye template S6. As shown in FIG. 8, the preferred eye template of the present invention includes a resolution of 19 pixels horizontally and 13 pixels vertically This resolution change, or resizing, enables the eyes in the images to be matched at the same resolution of a template and against the same amount of structural detail, as will be described in detail herein below. An alternative is to design a set of templates with different amounts of detail and keep the resolution of the image unchanged. Such an alternative design is readily accomplished by those skilled in the art.

Figure 10:
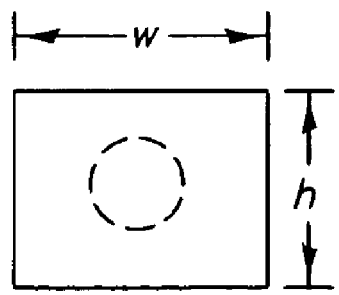
FIG. 10 is an illustration of the determination of the search window.

Referring back to FIG. 7a, a rectangular-shaped search window is formed around one of the initial estimates of eye positions S8; the sides of the window are defined as a weighted product of the previously determined estimate size of the eye, as illustrated by the following equation that is graphically illustrated in FIG. 10: where w is the width in pixels, h is the height in pixels, and s is the estimate size of the eye, $s=d/1.618$. The initial estimate of eye position is used as the center of the search window. Alternative designs of the search window are readily accomplished by those skilled in the art.

The cross-correlation between the template and the image is computed by sequentially moving the center pixel of the template to each pixel in the defined search window and performing a specific type of zone-based cross-correlation at each pixel location for determining the center pixel of the eye S10, as will be described in detail below.

Referring briefly to FIG. 7b, a zone-based cross-correlation S10 is initialized S10a. A template is then retrieved and normalized S10b, if it is not already stored in a normalized state. Referring briefly to FIG. 8, the template is preferably generated from sampling a plurality of eyes and relating their corresponding pixel values, for example by taking the average values at each pixel location. The template is then partitioned into four sub-regions that represent the eyelid, iris, and the two corners of the eye To normalize the template, the average pixel value for the entire template image is subtracted from each pixel value and the resulting pixel value is divided by the standard deviation of the entire template image for obtaining a normalized pixel value. The resulting template therefore has a mean value of zero and a unit variance.

Referring back to FIG. 7b, with the center of the template at the pixel location of interest, the zone-based cross-correlation includes, first, extracting a block from the image with its center at the current pixel and its size/orientation the same as the template S10c and normalizing the extracted image block S10d. Compute the cross-correlation between each sub-region of the extracted block and its counterpart in the template with the pixel of the image at the center of the sub-region S10e, hereinafter referred to as a zone-based correlation. If the cross-correlation for each sub-zone meets or exceeds a predetermined threshold, preferably 0 5, cross-correlation is performed with the entire template to the same image pixels of interest S10f, hereinafter referred to as a complete correlation. If a threshold, preferably 0.7, is again met, the program temporarily stores the correlation value and the size/orientation of the template in a buffer S10h. If the cross-correlation for one or more sub-zones fails the threshold or the cross-correlation for the entire template fails the threshold, the cross-correlation at the pixel of interest is set to "0" and the associated size/orientation are set to "N/A" S10i. The program then continues to next pixel location S10l for repeating the above-described partitioned and complete cross-correlations, if not the last pixel in the window The above-described zone-based correlation and complete correlation are repeated by varying the template for a plurality of sizes around the estimate size (increasing and decreasing) and a plurality of orientations around the estimate orientation (clockwise and counter-clockwise rotation), in order to refine the size and orientation of the eye S10j. Such increasing and decreasing of the template size/orientation is readily accomplished by those skilled in the art. This refinement involves the same previously described steps, S10c–S10i. If one or more complete correlation scores at a pixel location of interest result in a value above the threshold, the program selects the highest correlation value in the temporary buffer and its corresponding template size/orientation used for obtaining the highest value and places them in memory S10k. It facilitates understanding to note that the above-described varying of the template size is for further refining the estimated size of the eye, and the size/orientation of the best-matching template variation in turn indicate the exact size/orientation of the actual eye.

For example, the template size is increased by 10% and decreased by 10%. If the highest correlation value is from the 19×13 resolution template, the estimated size of the eye is not adjusted. If either of the other resolutions produce the highest correlation value, the estimated size of the eye is adjusted so that it matches the template size producing the highest correlation score. Similarly, the template orientation is increased by 10 degrees and decreased by 10 degrees. If one or more complete correlation scores at the pixel location of interest result in a value above the threshold, the program selects the highest correlation value in the temporary buffer and its corresponding template orientation used for obtaining the highest value and places it in memory. If the highest correlation value is from the template at the original estimated orientation, the estimated orientation of the eye is not adjusted. If either of the other orientations produce the highest correlation value, the estimated orientation of the eye is adjusted so that it matches the template orientation producing the highest correlation value.

The process then continues to the next pixel location for repeating the above-described zone-based and complete correlation S10*l* after the size and orientation have been refined for the pixel of interest S10*k*. A search window is then defined for the other eye, and the above-describe processes for the first eye are then repeated for the pixels within this search window.

Referring back to FIG. 7*a*, at this point, the process may select the pixel at the location containing the highest correlation score in each window S12, or continue on to verify the most likely candidates from the plurality of peak correlation points in each window as the center pixel of the eye S14–S20. The peak points are located as the points having a local maximum complete correlation score S14. The locations of these peaks are stored in a buffer S16.

Figure 11:
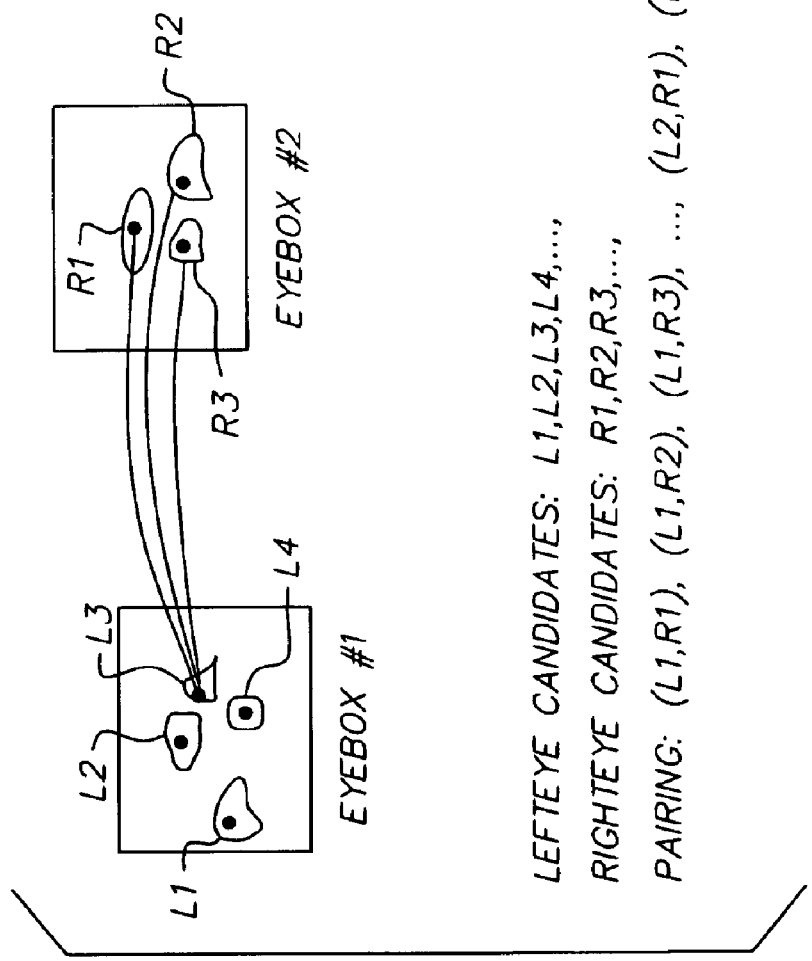
FIG. 11 is an illustration of the paring of eye candidates.
Figure 12:
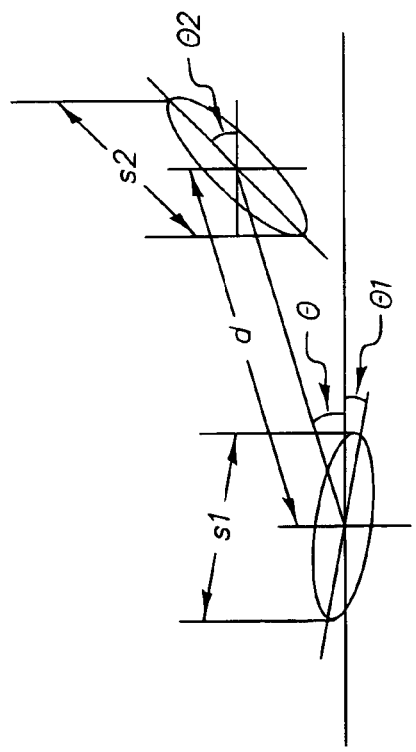
FIG. 12 is an illustration of the verification procedure for the distance between and orientation of the two eyes.

Referring to FIG. 11, a plurality of verification steps are used. The steps involve matching known characteristics about a pair of eyes to all combinations of pixels selected during correlation, and a scoring technique is used (figures-of-merit) to select the most likely pair of locations for the center of the eyes. The first step is to form all combinations of pixels selected as likely candidates in the two windows S18. In other words, each peak pixel from one window is paired with all the other peak pixels in the other window, as illustrated in FIG. 11. The angular orientation is then determined (i.e. the angle between the line formed between the two pixels of interest and a horizontal line through one of the points, preferably the pixel on the left). If the angular orientation is not within five degrees of the estimated angular orientation in S10*c*, the pair is eliminated as possible candidates for the center of both eyes If it is within five degrees of the estimated angular orientation, the pair is stored along with its particular score.

Also, the distance between the two candidate eyes is determined. If the distance is not proportional to the size of the eyes according to the knowledge of the human faces, the pair is eliminated as possible candidates for the center of both eyes. If the proportion is within 20% of the normal proportion, the pair is stored along with its particular score.

Figure 13:
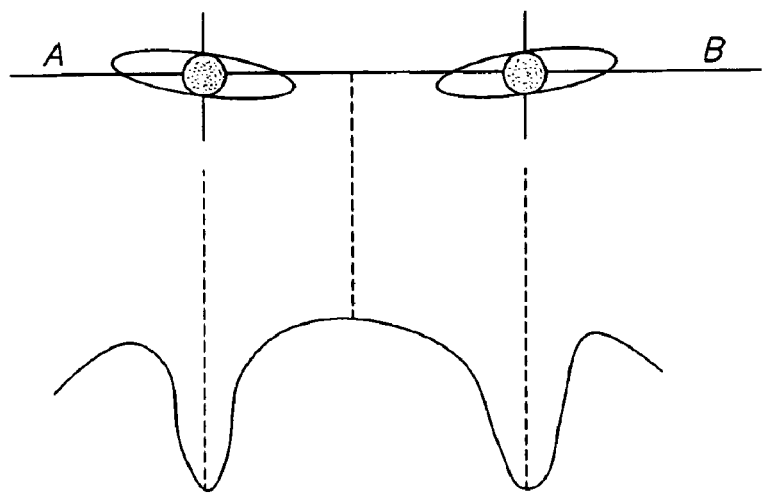
FIG. 13 is an illustration of matching of the eye-to-eye profile.

Referring to FIG. 13, the next step involves taking the pixels along a horizontal line through the two pixels in a possible combination. A graph of code values versus pixel location for each combination will have a shape as illustrated in FIG. 13. If the shape deviates substantially, the pair is eliminated as possible candidates for the center of the eyes; if it does not substantially deviate, the pair is stored along with its particular score. The deviation is preferably determined by the ratio of the middle peak point and the average of the two valley points, although those skilled in the art can determine other suitable measures of the deviation.

Figure 15:
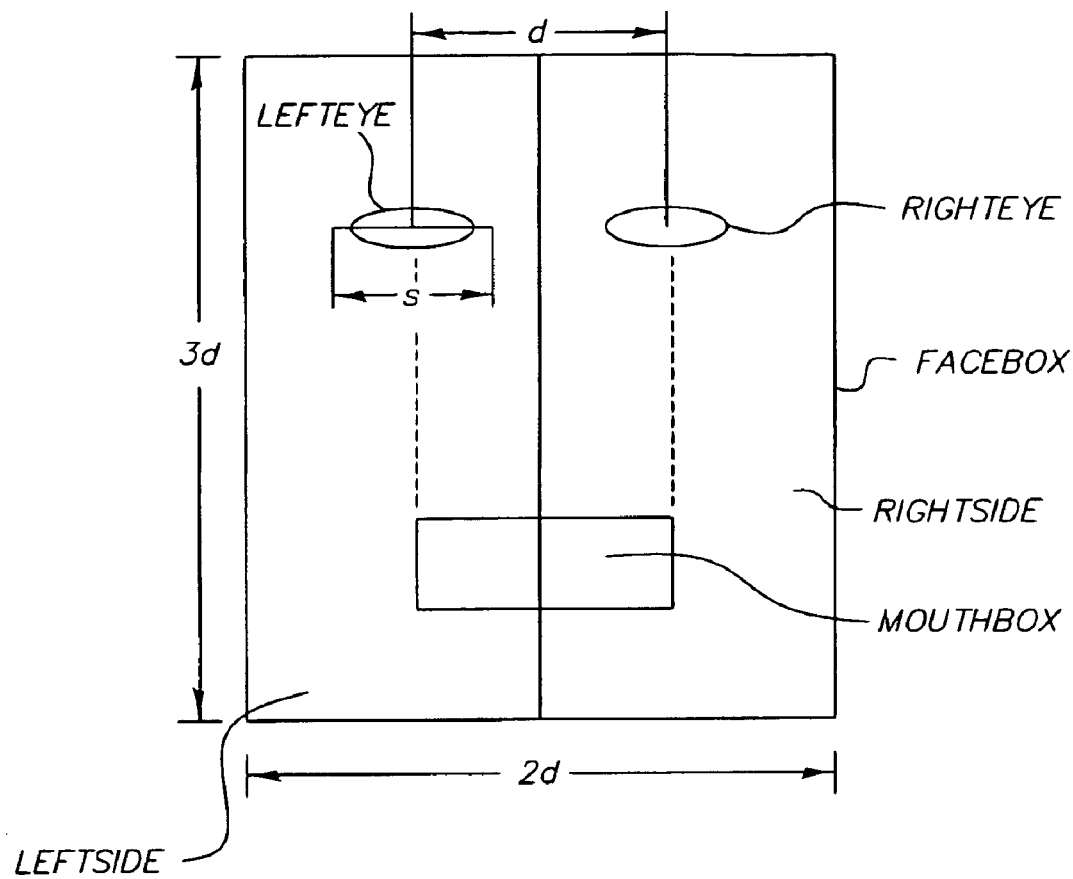
FIG. 15 is an illustration of a symmetry profile.

Referring to FIG. 15, all combinations are then examined for symmetry. This includes taking the distance between all combinations and, at a distance halfway between them, looking for symmetry on both sides of the image through pixels vertically through this halfway point. The region of interest, which contains the face, preferably has a width of twice the distance between the eyes and a height of three times the distance between the eyes. The face region is divided into two halves—the left side and the right ride according to the positions of the eyes. The symmetry is preferably determined by the correlation between the left side and the mirror image of the right side, although those skilled in the art can determine other suitable measure of the symmetry. If symmetry exists for the two sides, the pair and its particular score is again stored; if no symmetry exits, the pair is eliminated as a possible pair of candidates.

Also referring to FIG. 15, the image is next examined for the existence of a mouth at an estimated position. The process searches for three or four parallel lines (edges) within a rectangular box that has a width equal to the distance between the eyes and at a predetermined distance from the pair of pixels being analyzed. This distance is 1.2 times the distance between the candidate pairs, although those skilled in the art may determine other distance values or similar criteria. If the lines (edges) exist, the pair and its particular score are stored; if not, the pair is eliminated as possible candidates.

The combinations are then examined for proximity of the pixel locations to initial input locations. The proximity is measured by distance in pixels. If the proximity holds, the pair and their score are stored; if not, the pair is eliminated as possible candidates. The combinations are then examined for combined correlation of the two candidates. The combined correlation is the sum of the complete correlation scores at the two candidate locations. If the combined correlation is above a predetermined threshold, the pair and their score are stored; if not, the pair is eliminated as possible candidates. The most likely pair is the pair that has the highest cumulative scores S20. The final locations of the eyes are determined by this pair S22.

Figure 14:
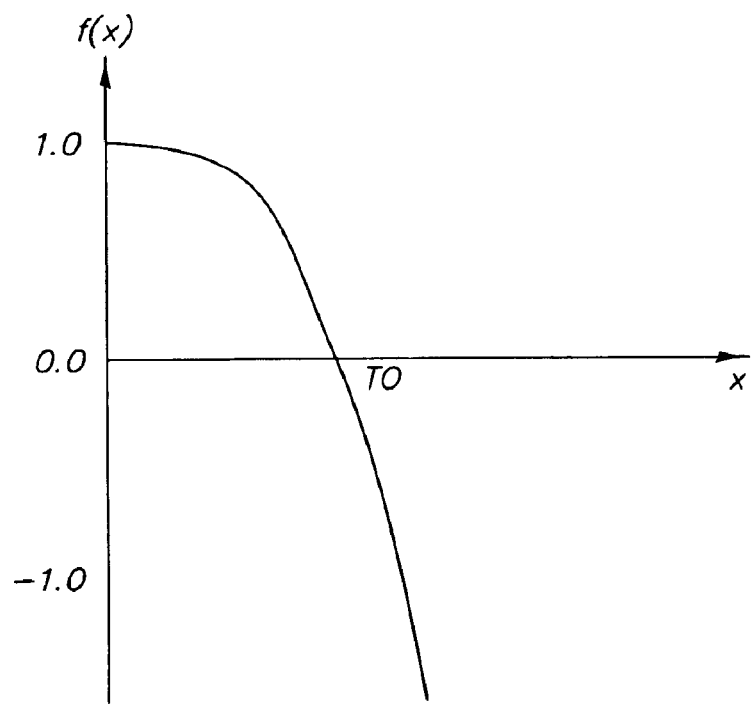
FIG. 14 is an illustration of the scoring function.

The shape of scoring functions for each above-described figure of merit is illustrated in FIG. 14. With this scoring function, even if a combination fails the threshold of a particular figure of merit, it is assigned a large penalty but can still be retained for further consideration. If a figure of merit x is satisfactory with respect to the threshold T0, the output of the scoring function, which is the input to the score accumulator, is close to a normalized maximum value of 1.0. If x fails the threshold, a increasing amount of penalty is accessed depending on how badly x fails. The advantage of using such a scoring function is improved robustness if a candidate barely fails the threshold but turns out to have the highest cumulative score.

The subject matter of the present invention relates to digital image understanding technology, which is understood to mean technology that digitally processes a digital image to recognize and thereby assign useful meaning to human understandable objects, attributes or conditions, and then to utilize the results obtained in the further processing of the digital image.

The invention has been described with reference to a preferred embodiment. However, it will be appreciated that variations and modifications can be effected by a person of ordinary skill in the art without departing from the scope of the invention

| PARTS LIST | |
|---|---|
| 100 | image source |
| 102 | image processor |
| 104 | image display |
| 106 | data and command entry device |
| 107 | computer readable storage medium |
| 108 | data and command control device |
| 109 | output device |
| 201 | color histogram equilization block |
| 202 | skin color detection block |

-continued

PARTS LIST

| | |
|---|---|
| 204 | oval region extraction block |
| 206 | iris color pixel detection block |
| 208 | group iris pixels into cluster step |
| 210 | find cluster center block |
| 212 | oval division block |
| 214 | initial estimate of eye position block |
| 216 | locate final eye position block |
| 226 | Iris color/Bayes Model Training block |
| 300 | oval_top |
| 302 | oval_bottom |
| 304 | oval_left |
| 306 | oval_right |
| 308 | oval_center_row |
| 310 | oval_center_column |
| 402 | conditional probability that a given pixel is an iris pixel |
| 404 | conditional probability that a given pixel is a non-iris pixel |
| 502 | iris pixels |
| 504 | non-iris pixels |
| 506 | probability of iris pixel in face region |
| 508 | probability of non-iris pixel in face region |
| 510 | probability a pixel intensity is iris |
| 600 | center position |
| 602 | pixel cluster |
| 604 | left half region |
| 606 | right half region |
| S2 | initiate process |
| S4 | estimate size of eyes |
| S6 | eye template |
| S8 | form search window |
| S10 | determine center pixel of eye |
| S10a | initialize zone base correlation |
| S10b | retrieve and normalize template |
| S10c | extract block |
| S10d | normalize extracted block |
| S10e | compute cross correlation |
| S10f | perform cross correlation with entire template |
| S10h | store correlation value in buffer |
| S10i | set across correlation to zero |
| S10j | vary template |
| S10k | select highest correlation value |
| S10l | continue |
| S12 | select pixel at highest correlation point |
| S14 | local maximum correlation |
| S16 | store peak locations in buffer |
| S18 | form pixel combinations |
| S20 | pair with highest cumulative score |
| S22 | final eye locations |

What is claimed is:

1. A digital image processing method for locating human eyes in a digital image, comprising the steps of:
   a) detecting a skin colored region in the image;
   b) detecting human iris color pixels in the skin colored region irrespective of the brightness of the skin colored region;
   c) forming initial estimates of eye positions using the locations of the detected iris color pixels in the skin colored region;
   d) estimating the size of each eye based on the distance between the estimated initial eye positions;
   e) forming a first search window for one eye, the center of the window being the estimated initial position for the one eye and the size of the window being proportional to the estimated size of the one eye; and
   f) employing a template to locate an eye in the first search window.

2. The method claimed in claim 1, further comprising:
   g) forming a second search window for another eye; the center of the window being the estimated initial position for the other eye and the size of the window being proportional to the estimated size of the other eye; and
   h) employing a template to locate another eye in the second search window.

3. The method claimed in claim 1, further comprising the step of finding an oval shaped skin color region, and locating eyes in only the oval shaped skin color region.

4. The method claimed in claim 3, wherein the step of forming initial estimates of eye positions comprises the steps of:
   a) grouping the detected iris color pixels into clusters;
   b) finding the center of each iris color pixel cluster;
   c) dividing an oval region into a left-half and a right-half along a major axis of the oval region; and
   d) forming the initial estimates of eye positions based on the location of the centers of the clusters in relation to the left and right halves of the oval region.

5. The method claimed in claim 1, wherein the step of detecting human iris color pixels, comprises the steps of:
   c1) deriving probability distributions of iris and non-iris colored pixels from a number of sample images; and
   c2) using the derived probability distributions in a Bayes model to produce a look up table indicating the probability that a given pixel is an iris colored pixel.

6. The method as claimed in claim 2, wherein the step of employing a template to locate an eye in a search window comprises determining a plurality of eye locations in the search window that give a desired matching response to the template.

7. The method as claimed in claim 6 further comprising the step of finding a best pair of eye locations, one eye location from each window.

8. The method as claimed in claim 7, wherein the step of finding the best pair of eye locations includes computing a plurality of figures of merit for each pair of eye locations and summing the figures of merit for each pair of eye locations.

9. The method as claimed in claim 8, wherein the step of computing a plurality of figures of merit selected from the group comprising: orientation, proximity, combined matching score, proportion, profile, and evidence of mouth.

10. The method as claimed in claim 9, wherein the step of computing a proximity figure of merit includes measuring the proximity of the located eyes to the estimated initial eye positions.

11. The method as claimed in claim 9, wherein the step of employing a template to locate an eye in a search window comprises determining a plurality of eye locations in the search window that give a desired matching response to the template, and wherein the step of computing a combined matching score includes summing up individual matching scores.

12. The method as claimed in claim 9, wherein the step of computing a proportion figure of merit includes providing an anthropological eye distance model, and computing a value representing the match between a distance between the located eyes with the anthropological eye distance model.

13. The method as claimed in claim 9, wherein the step of computing a profile figure of merit includes: providing a pre-determined model of an eye-to-eye profile; determining an actual eye to eye profile; and computing a goodness-of-fit between the actual eye to eye profile to the eye to eye model profile.

14. The method as claimed in claim 9, wherein the step of computing an evidence of mouth figure of merit includes: computing values representing strength and orientation of edges within a mouth window determined by a pair of eye locations.

15. The method as claimed in claim 6 wherein the desired matching response is a local maximum matching score.

* * * * *